US006996731B1

(12) United States Patent
Obitsu (10) Patent No.: US 6,996,731 B1
(45) Date of Patent: Feb. 7, 2006

(54) METHOD AND APPARATUS FOR CONTROLLING A SUPPLY OF POWER IN AN ELECTRONIC APPARATUS USING A COMBINATION OF PLURALITY OF DETACHABLE UNITS

(75) Inventor: Toshiro Obitsu, Inagi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/535,984

(22) Filed: Mar. 27, 2000

(30) Foreign Application Priority Data

May 12, 1999 (JP) ............................ 11-131373
Mar. 17, 2000 (JP) ............................ 2000-77015

(51) Int. Cl.
*G06F 1/26* (2006.01)
*G06F 1/32* (2006.01)

(52) U.S. Cl. ............... 713/324; 713/300; 713/320; 713/322; 713/323

(58) Field of Classification Search ......... 713/320, 713/323, 324, 330, 340; 710/8, 10
See application file for complete search history.

(56) References Cited

U.S. PATENT DOCUMENTS

| 4,507,679 | A | * | 3/1985 | Bendell | 348/238 |
| 4,747,041 | A | * | 5/1988 | Engel et al. | 713/324 |
| 5,452,256 | A | * | 9/1995 | Ichikawa | 365/226 |
| 5,475,271 | A | | 12/1995 | Shibasaki et al. | |
| 5,483,656 | A | * | 1/1996 | Oprescu et al. | 713/320 |
| 5,613,159 | A | * | 3/1997 | Colnot | 710/11 |
| 5,721,937 | A | * | 2/1998 | Kurihara et al. | 713/323 |
| 5,781,798 | A | * | 7/1998 | Beatty et al. | 710/10 |
| 5,881,300 | A | * | 3/1999 | Chen | 713/340 |
| 5,935,228 | A | * | 8/1999 | Shinomura | 713/100 |
| 6,029,211 | A | * | 2/2000 | Nakashima | 710/14 |
| 6,085,982 | A | * | 7/2000 | Nakashima | 235/492 |
| 6,145,046 | A | * | 11/2000 | Jones | 710/301 |
| 6,381,662 | B1 | * | 4/2002 | Harari et al. | 710/301 |
| 6,522,640 | B2 | * | 2/2003 | Liebenow | 370/338 |
| 6,678,065 | B1 | * | 1/2004 | Hikawa | 358/1.13 |
| 2002/0013162 | A1 | * | 1/2002 | Whitney | 455/557 |

FOREIGN PATENT DOCUMENTS

| JP | 5-66858 | 3/1993 |
| JP | 5-66864 | 3/1993 |
| JP | 5-66867 | 3/1993 |
| JP | 5-30930 | 4/1993 |
| JP | 6-266480 | 9/1994 |

OTHER PUBLICATIONS

Moghe, S.; Stone, J.; Stratmoen, S.; Consolazio, S.; Rausch. K.; Geske, S.; Patel, M.; "Mobitex PC card wireless modem", Microwave Symposium Digest, 1997., IEEE MTT-S International , vol.: 3 , Jun. 8-13, 1997, Page(s): 1391-1394 vol. 3.*

* cited by examiner

*Primary Examiner*—Lynne H. Browne
*Assistant Examiner*—James K. Trujillo
(74) *Attorney, Agent, or Firm*—Staas & Halsey LLP (57) ABSTRACT

In an electronic apparatus for realizing a desired function by combining a plurality of units, a judging part judges whether a combination of the plurality of units is to realize the desired function and a power supply control part controls a supply of power from a power source to at least one of the units of the combination used to realize the desired function based on a judgement result of the judging part.

17 Claims, 8 Drawing Sheets

METHOD AND APPARATUS FOR CONTROLLING A SUPPLY OF POWER IN AN ELECTRONIC APPARATUS USING A COMBINATION OF PLURALITY OF DETACHABLE UNITS

BACKGROUND OF THE INVENTION

1. Field of the Invention

The present invention generally relates to electronic apparatuses, power control apparatuses and methods for controlling a supply of power, and more particularly to an electronic apparatus, a power control apparatus and a method for controlling a supply of power in that desired functions can be realized by using a connector device corresponding to a function device connected to an detachable function device.

Recently, a laptop personal computer using a battery is provided. In such a laptop personal computer, just the most essential functions are provided in its base unit to minimize the base units. Accordingly, a PC card slot is provided in the base unit to extend their functions. A desired function is realized by mounting a PC card, which has a needed extended function, to the PC card slot.

2. Description of the Related Art

A conventional portable or laptop personal computer will be described by referring to FIG. 1.

Figure 1:
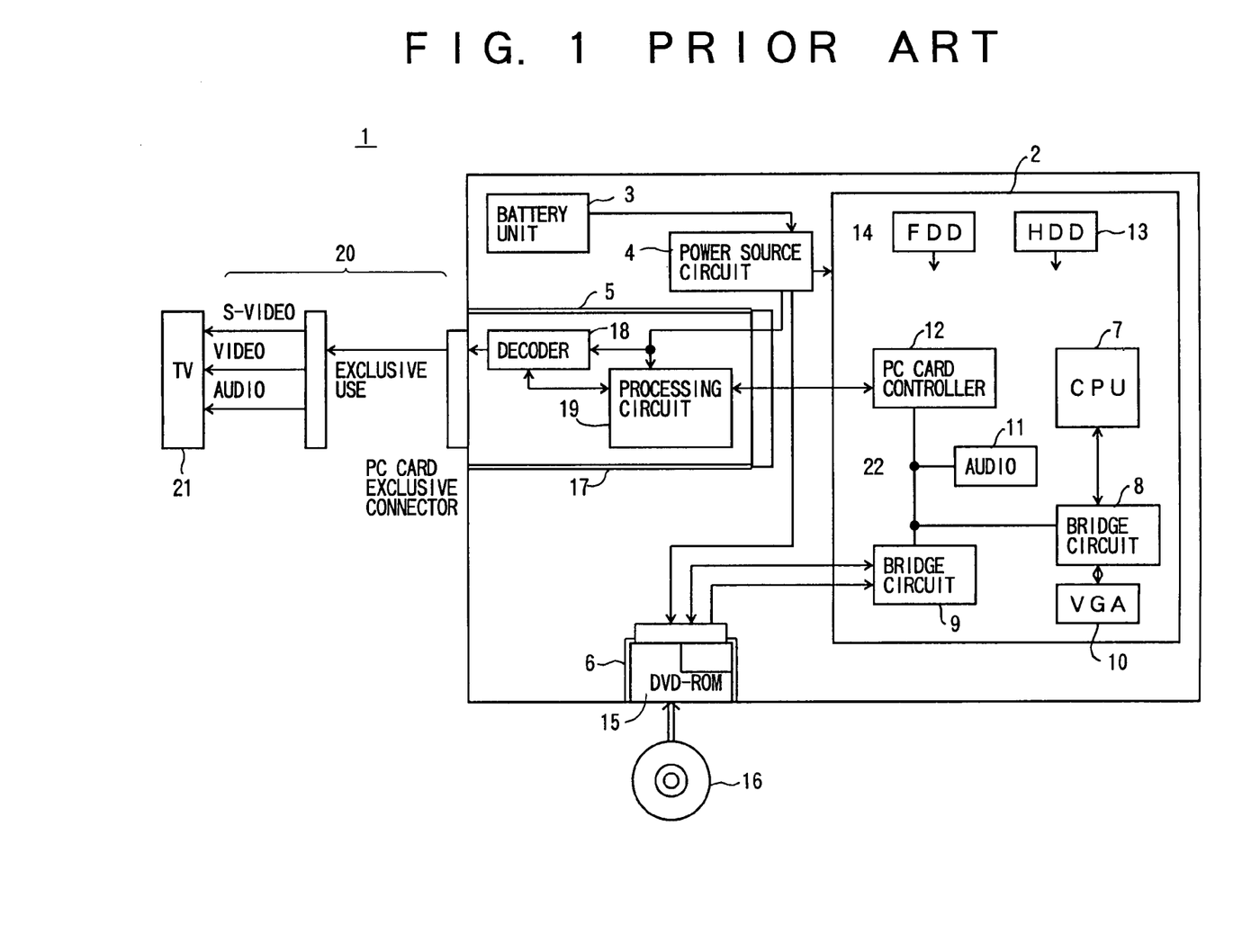
FIG. 1 is a block diagram showing a construction of the conventional laptop personal computer.

FIG. 1 is a block diagram showing a construction of the conventional laptop personal computer.

The conventional laptop personal computer 1 includes an information processing system 2, a battery unit 3, a power source circuit 4, a PC card slot 5 and a drive bay 6.

The information processing system 2 includes a CPU 7, bridge circuits 8 and 9, a graphic controller VGA 10, an audio controller 11, a PC card controller 12, a hard disk drive 13 and a floppy disk drive 14.

The CPU 7 processes information in accordance with programs. The bridge circuit 8 is provided between the CPU 7 and each part and controls a connection between the CPU 7 and each part.

The bridge circuit 9 is provided between the drive bay 6 and a bus 22 and controls a connection between the drive bay 6 and the bus 22. The graphic controller VGA 10 controls for displaying processed data.

The audio controller 11 processes audio data. The PC card controller 12 is provided between the PC card slot 5 and the bus 22 and controls a connection between the PC card slot 5 and the bus 22.

The battery unit 3 generates power. Voltage generated by the battery unit 3 is supplied to the power source circuit 4. The power source circuit 4 supplies power to a drive unit mounted to the drive bay 6 and a PC card inserted into the PC card slot 5.

A drive unit, such as a CD-ROM drive unit, a DVD-ROM drive unit, a hard disk drive unit or a magneto-optical disc drive unit, is mounted to the drive bay 6. A PC card, such as a modem card, an IC memory card, a SCSI card or a DVD decoding card, is inserted into the PC card slot 5.

A case of mounting the DVD-ROM drive unit to the drive bay 6 will now be described.

As shown in FIG. 1, the DVD-ROM drive unit 15 is mounted to the drive bay 6 in order to read data from a DVD-ROM disk 16. However, the CPU 7 can not process signals read by the DVD-ROM disk unit 15 because the data from the DVD-ROM drive unit 15 is encoded. Accordingly, in a system shown in FIG. 1, a DVD decoding card 17 is inserted into the PC card slot 5 to decode the data read by the DVD-ROM disk unit 15. The signals are converted to data that can be processed by the CPU 7 so as to be displayed.

The DVD decoding card 17 includes a decoder 18 and a processing circuit 19. The decoder 18 decodes data read by the DVD-ROM drive unit 15. The processing circuit 19 controls the data to decode at the decoder 18.

The DVD decoding card 17 is capable of connecting to an exclusive cable 20 for a television. Images and audio are output to a television receiver 21 via the exclusive cable 20.

In the conventional laptop personal computer shown in FIG. 1, when the PC card is inserted into the PC card slot 5, the power source circuit 4 always supplies power to the PC card slot 5, regardless of use or not use. For example, when the DVD decoding card 17 is inserted into the PC card slot 5, power is always supplied to the DVD decoding card 17 even if the DVD-ROM drive unit 15 is not connected to the drive bay 6. As a result, the battery unit 3 consumes extra power. In a state in which the DVD decoding card 17 is not used to decode data from the DVD-ROM disk 16, the power supplied to the DVD decoding card 17 is completely wasted.

SUMMARY OF THE INVENTION

It is a general object of the present invention to provide an electronic apparatus, a power control apparatus and a method for controlling a supply of power, in which the above-mentioned problems are eliminated.

A more specific object of the present invention is to provide an electronic apparatus, a power control apparatus and a method for controlling supply of power, which can reduce unwanted power consumption.

The above objects of the present invention are achieved by an electronic apparatus for realizing a desired function by combining a plurality of units, including: a judging part judging whether a combination of the plurality of units is to realize the desired function; and a power supply control part controlling a supply of power from a power source to at least one of the units of the combination used to realize the desired function based on a judgement result of the judging part.

According to the present invention, it is judged whether the combination of the plurality of units is that for realizing the desired function and the supply of power to at lease one of the units that are used to realize the desired function is controlled. Therefore, when the combination is not to realize the desired function, at least one unit that is used to realize the desired function is not supplied power. Accordingly, unwanted power consumption can be reduced.

On the other hand, other units that are used to realize another function are supplied power. Thus, the another function can be realized.

The above objects of the present invention are achieved by an electronic apparatus connectable to a plurality of units, including: a judging part judging whether a combination of at least two of the plurality of units is a predetermined combination; and a power source control part stopping a supply of power to at least one unit in the combination when the judging part judges that the combination is the predetermined combination.

According to the present invention, in accordance with the combination of the two units of the plurality of units is the predetermined combination, it is possible to stop supplying power to at least one unit that is not required. Therefore, unwanted power consumption can be reduced.

On the other hand, other units that are used to realize another function are supplied power. Thus, the another function can be realized.

Moreover, the above objects of the present invention are achieved by a power control apparatus for an electronic apparatus which realizes a desired function by combining a plurality of units, including: a judging part judging whether a combination of the plurality of units is to realize the desired function; and a power supply control part controlling a supply of power from a power source to the units of the combination used to realize the desired function based on a judgement result of the judging part.

According to the present invention, it is judged whether the combination of the plurality of units is to realize the desired function and the supply of power to some units that are used to realize the desired function is controlled. Therefore, when the combination is not to realize the desired function, the units that are used to realize the desired function are not supplied power so that extra power consumption can be prevented.

On the other hand, other units that are used to realize another function are supplied power. Thus, the another function can be realized.

Furthermore, the above objects of the present invention are achieved by a method for controlling a supply of power in an electronic apparatus that realizes a desired function by combining a plurality of units, including the steps of: (a) judging whether a combination of the plurality of units is to realize the desired function; and (b) controlling the supply of power from a power source to at least one of the units of the combination used to realize the desired function based on a judgement result in step (a).

According to the present invention, it is judged whether the combination of the plurality of units is to realize the desired function and the supply of power to some units that are used to realize the desired function is controlled. Therefore, when the combination is not to realize the desired function, the units that are used to realize the desired function are not supplied power so that extra power consumption can be prevented.

On the other hand, other units that are used to realize another function are supplied power. Thus, the another function can be realized.

Other objects, features and advantages of the present invention will become more apparent from the following detailed description when read in conjunction with the accompanying drawings.

DESCRIPTION OF THE PREFERRED EMBODIMENTS

Figure 2:
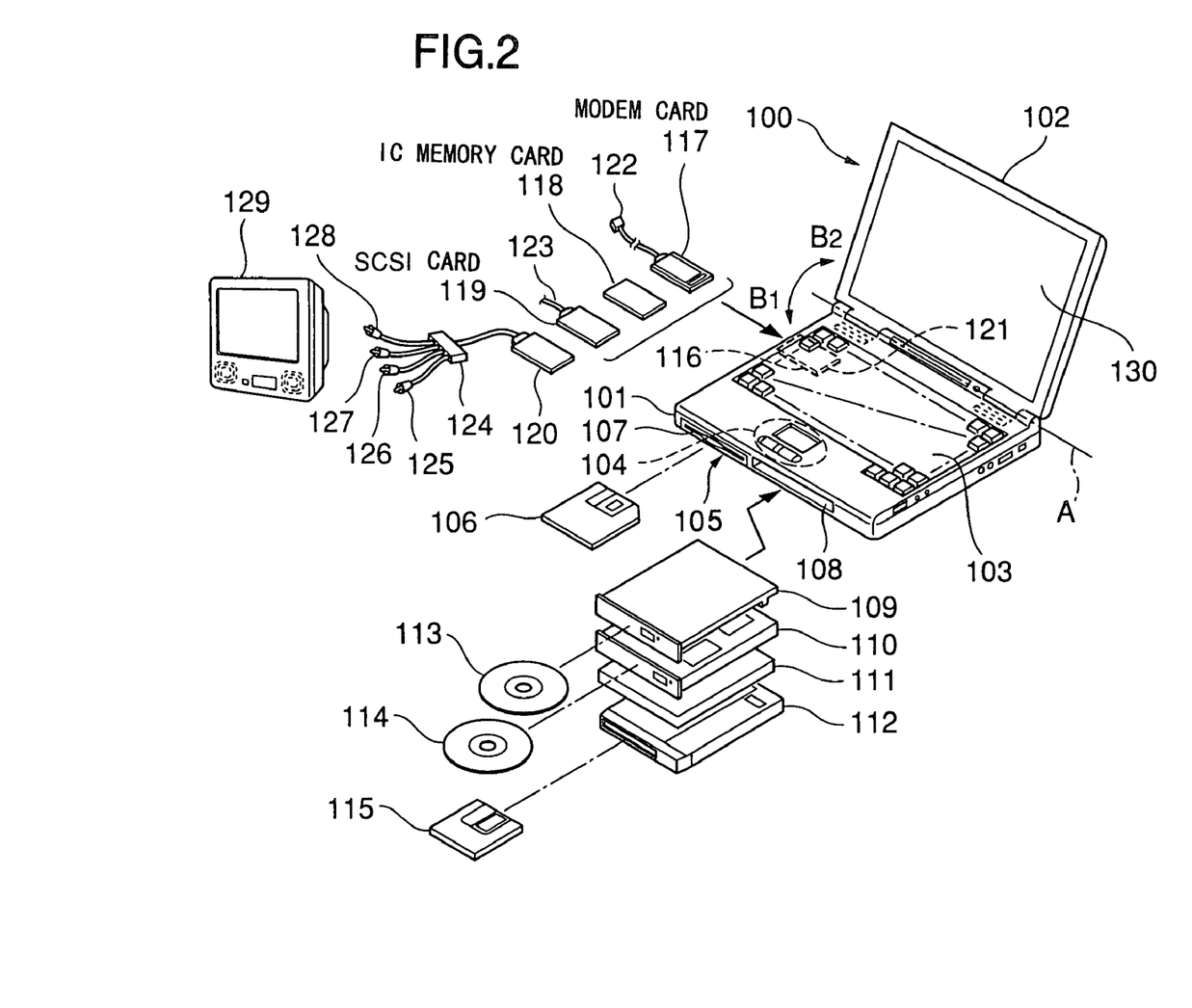
FIG. 2 is a diagram illustrating an electronic apparatus according to a first embodiment of the present invention.

FIG. 2 is a diagram illustrating an electronic apparatus according to a first embodiment of the present invention.

In the first embodiment, a laptop personal computer as the electronic apparatus will be described.

The laptop personal computer 100 includes a base unit 101 and a display part 102. The base unit 101 includes a keyboard 103 and a pointing device 104. The keyboard 103 includes a plurality of keys to input codes such as characters. The pointing device 104 includes a flat pointing device to move a pointer on a display and operate a desired button.

In addition, the base unit 101 provides an opening 107 to insert a floppy disk 106 to a floppy disk drive 105 and a multi bay 108 to connect to a detachable drive unit at the front of the base unit 101. The floppy disk drive 105 writes information on the floppy disk 106 and reads the information therefrom.

Any one of a CD-ROM drive unit 109, a DVD-ROM drive unit 110, a hard disk drive unit 111 and a magneto-optical disc drive unit 112 is mounted to the multi bay 108.

A CD-ROM disk 113 is inserted into the CD-ROM drive unit 109. The CD-ROM drive unit 109 operates CD-ROM disk 113 to read information recorded thereon.

A DVD-ROM disk 114 is inserted into the DVD-ROM drive unit 110. The DVD-ROM drive unit 110 reads information recorded on the DVD-ROM disk 114.

A hard disk is accommodated to the hard disk drive unit 111. The hard disk drive unit 111 operates the hard disk to write information on and to read the information from the hard disk.

A magneto-optical disc cartridge 115 which accommodates a magneto-optical disc is inserted into the magneto-optical disc drive unit 112. The magneto-optical disc drive unit 112 writes information to the magneto-optical disc accommodated in the magneto-optical disc cartridge 115 and reads the information recorded on the magneto-optical disc.

Also, a PC card slot 116 is provided at the left side of the base unit 101. A PC card, which is in conformity to the PCMCIA (Personal Computer Memory Card International Association) standard, is inserted into the PC card slot 116. A modem card 117, an IC memory card 118, a SCSI card 119 or a DVD decoding card 120 may be used as the PC card. In the PCMCIA standard, the PC card is 85.6 mm in length, 54 mm in width and 3.3 mm in thickness of a type 1 PC card, 5.0 mm in thickness of a type 2 PC card or 10.5 mm in thickness of a type 3 PC card.

In the modem card 117, an edge of one short side is connected to a terminal 121 of the PC card slot 116 provided inside of the base unit 101 and an edge of another short side is connected to one terminal of a communication cable 122. Also, another terminal of the communication cable 122 is connected to a telephone line. The modem card 117 is used to connect the base unit 101 to the telephone line.

In the IC memory card 118, an edge of one short side is connected to the terminal 121 of the PC card slot 116 provided inside of the base unit 101. The IC memory card 118 is used as an additional memory. Information recorded to the IC memory card 118 can not be erased when the PC card 118 is ejected from the base unit 101.

In the SCSI card 119, an edge of one short side is connected to the terminal 121 of the PC card slot 116 provided inside of the base unit 101 and an edge of another short side is connected to one terminal of a SCSI cable 123. Also, another terminal of the SCSI cable 123 is connected to peripheral equipment having a SCSI interface. The SCSI card 119 is used for an interface between the base unit 101 and peripheral equipment having a SCSI interface.

In the DVD decoding card 120, an edge of one short side is connected to the terminal 121 of the PC card slot 116 provided inside of the base unit 101. The DVD decoding card 120 decodes information, which is read from the DVD-ROM disk 114 inserted into the DVD-ROM drive unit 110 connected to the multi bay 108, into information that can be decoded by the CPU 7 in the base unit 101.

Also, in the DVD decoding card 120, an edge of another short side can be connected to a cable 124 connecting a television. The DVD decoding card 120 converts image information, which is read from the DVD-ROM disk 114 loaded into the DVD-ROM drive unit 110 mounted in the multi bay 108, to television signals and outputs converted image information to the cable 124 connecting to the television. One end of the cable 124 is connected to an end of another short side of the DVD decoding card 120. Another end of cable 124 has four pin jacks, namely, a stereo sound output pin jacks 125 and 126, an image output pin jack 127 and a S-image sound output pin jack 128. The stereo sound output pin jacks 125 and 126 of another end of the cable 124 are connected to stereo sound input terminals of a television receiver 129. The image output pin jack 127 is connected to an image input terminal of the television receiver 129. The S-image sound output pin jack 128 is connected to a S-image input terminal of the television receiver 129.

The display part 102 is pivotable in a B1 or B2 direction about an A axis provided at an end of a backside of the base unit 101. When the display part 102 is pivoted to the B1 direction from an opened position, a display panel 130 faces the base unit 101 covers the keyboard 103 and the pointing device 104 at a closed position. At the closed position, the form of the laptop personal computer 100 is about a flat board.

Also, when the display part 102 is pivoted to the B2 direction from the closed position, the display panel 130 and the keyboard 103 and the pointing device 104 are opened to operate. The display panel 130 of the display part 102 includes a LCD (Liquid Crystal Device) and displays information processed by the base unit 101.

Figure 3:
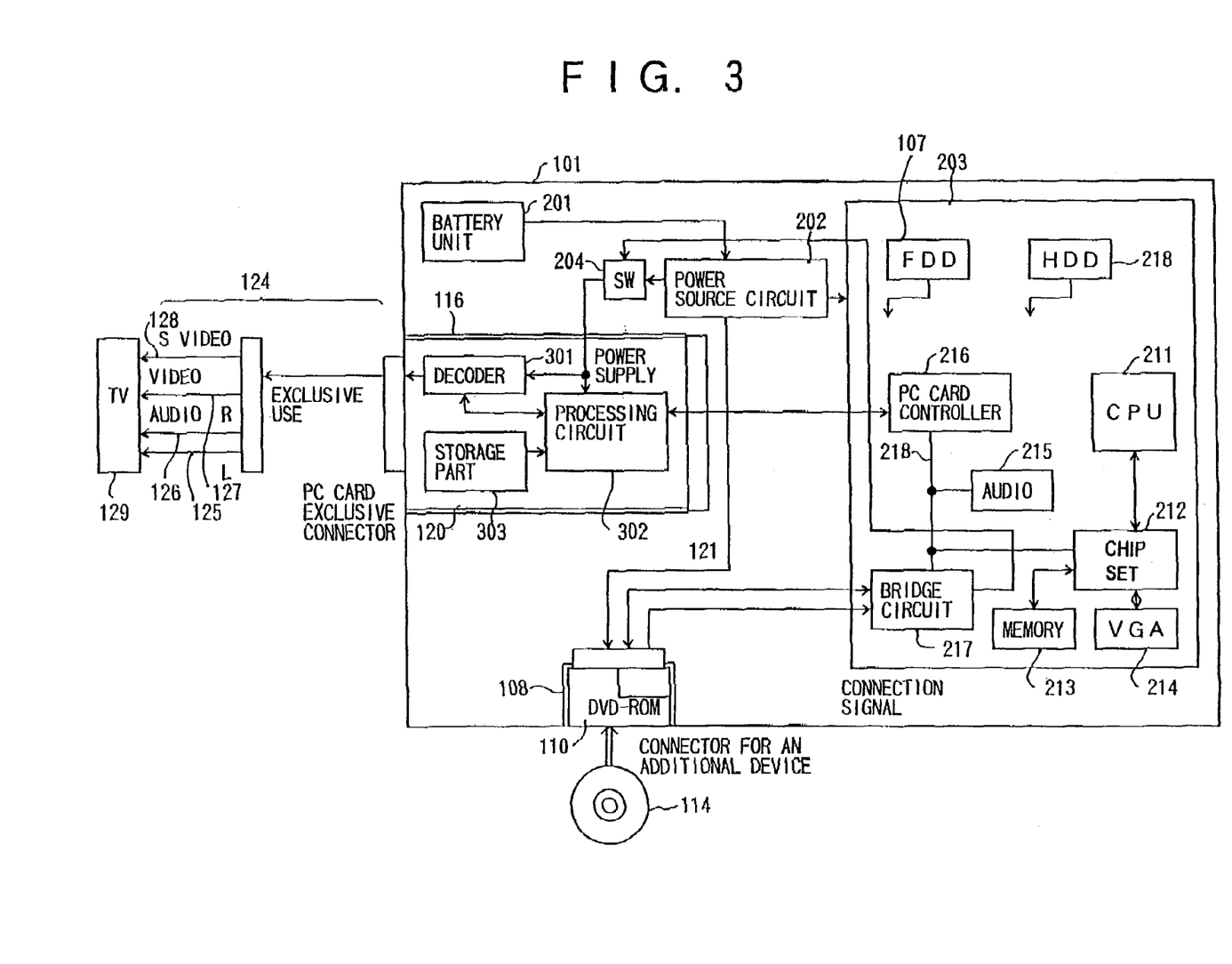
FIG. 3 is a block diagram showing a construction of a laptop personal computer according to the first embodiment of the present invention.

FIG. 3 is a block diagram showing a construction of a laptop personal computer according to the first embodiment of the present invention. In FIG. 3, parts that are the same as those shown in FIG. 2 are given the same reference numbers, and the description thereof is omitted.

A battery unit 201, a power source circuit 202, an information processing unit 203 and a power control switch 204 are internally mounted in the base unit 101.

The battery unit 201 is a power source to operate the laptop personal computer. The power source circuit 202 supplies voltage generated by the battery unit 201 to the DVD-ROM drive unit 110 inserted in the multi bay 108. The power source circuit 202 also supplies the voltage to the DVD decoding card 120 inserted into the PC card slot 116 through the power control switch 204.

The information processing unit 203 includes a CPU 211, a chip set 212, a memory 213, a video graphics controller 214, an audio card 215, a PC card controller 216, a bridge circuit 217 and hard disk drive 218.

The CPU 211 processes instructions in accordance with programs. The CPU 211 is connected to the chip set 212. Also, the chip set 212 is connected to the video graphics controller 214, the memory 213 and a bus 218. The chip set 212 controls a connection between the CPU 211 and each part.

The bridge circuit 217 connects the DVD-ROM drive unit 110 connected to the multi bay 108 to the bus 218. The bridge circuit 217 is also connected to the power control switch 204 and controls 'ON' or 'OFF' of the power control switch 204.

The DVD decoding card 120 will now be described.

The DVD decoding card 120 includes a decoder 301, a processing circuit 302 and an identification storage part 303. The decoder 301 decodes information read from the DVD-ROM drive unit 110. The processing circuit 302 supplies the information read from the DVD-ROM drive unit 110 to the decoder 301 and then outputs data decoded by the decoder 301 to the PC card controller 216. The identification storage part 303 stores a PC card identification and retrieves the PC card identification based on a command from the PC card controller 216. When power is turned ON, the processing unit 203 reads an ID information from the PC card connecting to the PC card slot 116 identifies the PC card to select a driver that is used.

The DVD-ROM drive unit 110 inserted in the multi bay 108 will be described.

Figure 4:
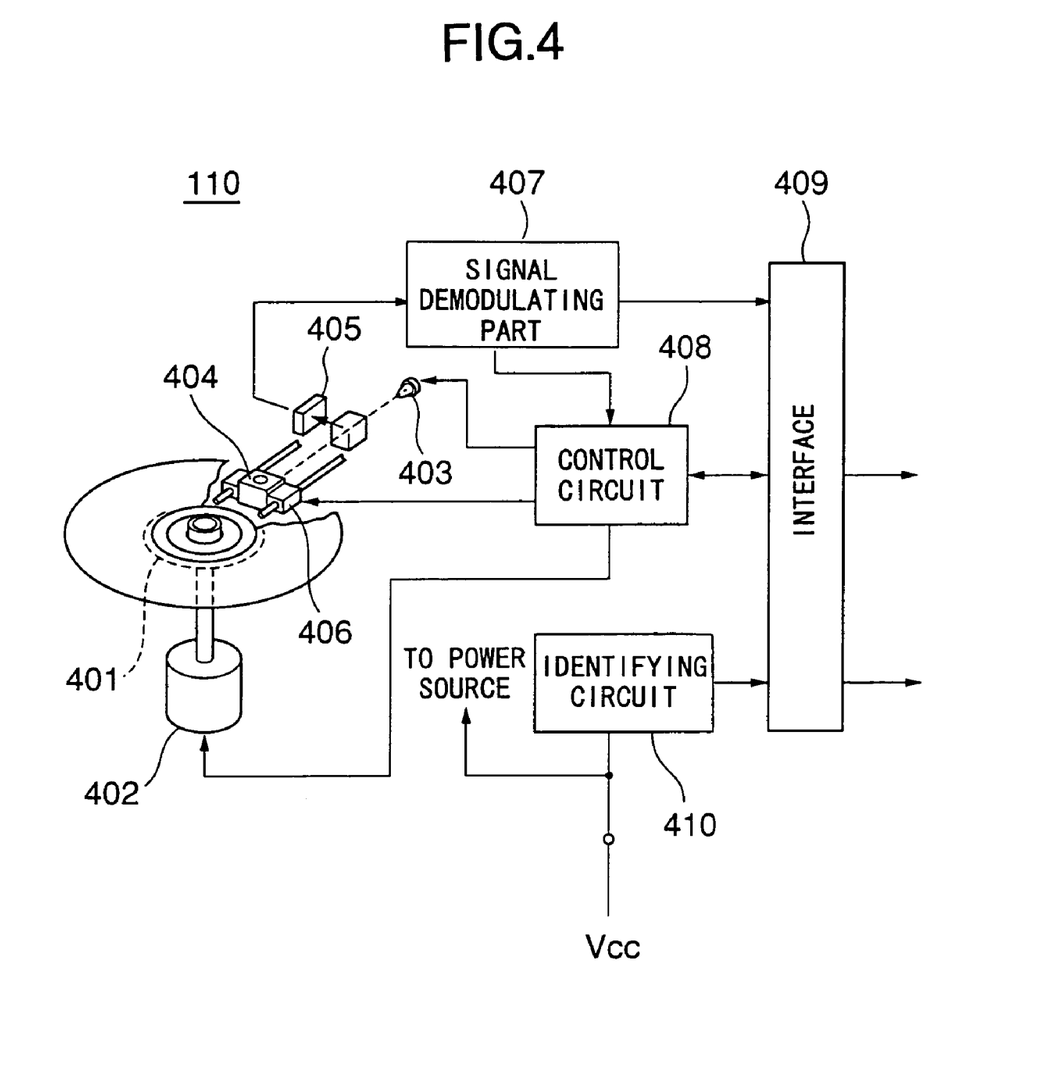
FIG. 4 is a block diagram illustrating a mechanism of the DVD-ROM drive unit according to the first embodiment of the present invention.

FIG. 4 is a block diagram illustrating a mechanism of the DVD-ROM drive unit according to the first embodiment of the present invention.

The DVD-ROM drive unit 110 includes a turntable 401, a spindle motor 402, a laser emission part 403, an optical head 404, a detection part 405, a VCM 406, a signal demodulating part 407, a control circuit 408, an interface 409 and an identifying circuit 410. The DVD-ROM disk 114 in FIG. 3 is mounted on the turntable 401. The spindle motor 402 is engaged with the turntable 401 and rotates the turntable 401.

The spindle motor 402 rotates the turntable 401 and then rotate the DVD-ROM disk 114 mounted on the turntable 401 is rotated. The optical head 404 is located to face the DVD-ROM disk 114. A laser beam emitted from the laser emission part 403 focuses on the DVD-ROM disk 114. The laser beam emitted from the optical head 404 to the DVD-ROM disk 114 is reflected and supplied to the detection part 405. The VCM 406 moves the optical head 404 in a radius direction and controls the optical head 404. By the controlled optical head 404, the laser beam follows a track that records data on the DVD-ROM disk 114. Signals detected by the detection part 405 are supplied to the signal demodulating part 407.

The signal demodulating part 407 demodulates detected signals. Signals demodulated by the signal demodulating part 407 are supplied to the DVD decoding card 120 in FIG. 3 through the information processing unit 203 in FIG. 3 through the interface 409.

The signal demodulated by the signal demodulating part 407 is supplied to the control circuit 408. The control circuit 408 controls the spindle motor 402, the laser emission part 403 and the VCM 406 in accordance with the signals supplied from the signal demodulating part 407. Also, the control circuit 408 is connected to the information processing unit 203 through the interface 409 and controls each part in accordance with commands from the information processing unit 203.

The identifying circuit 410 receives power from the power source circuit 202 and sends a signal for identifying the DVD-ROM drive unit 110 to the information processing unit 203 through the interface 409. The identifying circuit 410 is provided to not only the DVD-ROM drive unit 110 but also other drive units, that is, the CD-ROM drive unit 109, the hard disk drive unit 110 or the magneto-optical disc drive unit 112. In the information processing unit 203, a drive unit connected in the multi bay 108 is identified based on information result of the identifying circuit 410. Accordingly, the information processing unit 203 executes processes corresponding to the drive unit connected in the multi bay 108.

The identifying circuit 410 will now be described.

Figure 5A:
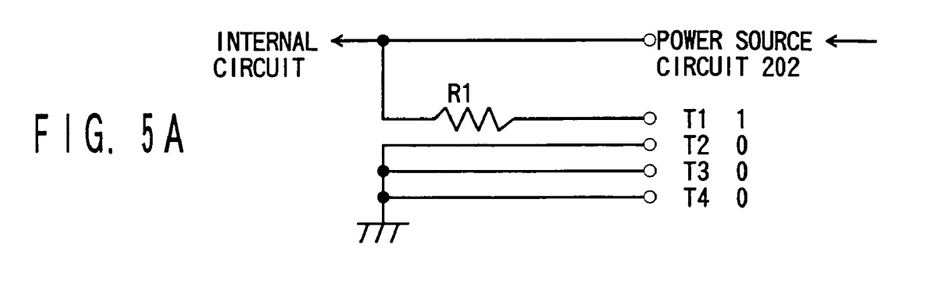
FIG. 5A through FIG. 5D are diagrams showing identifying circuits for the drive units according to the first embodiment of the present invention.
Figure 5B:
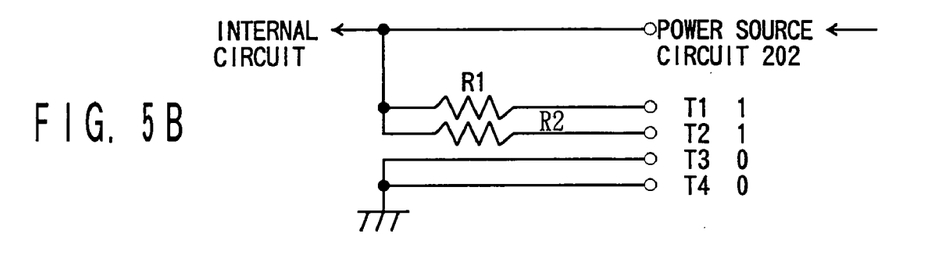
Figure 5C:
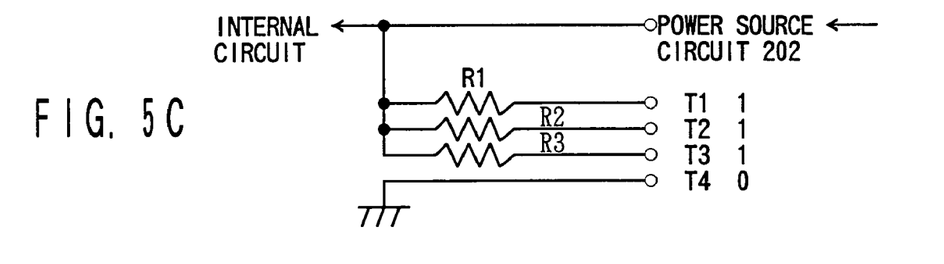
Figure 5D:
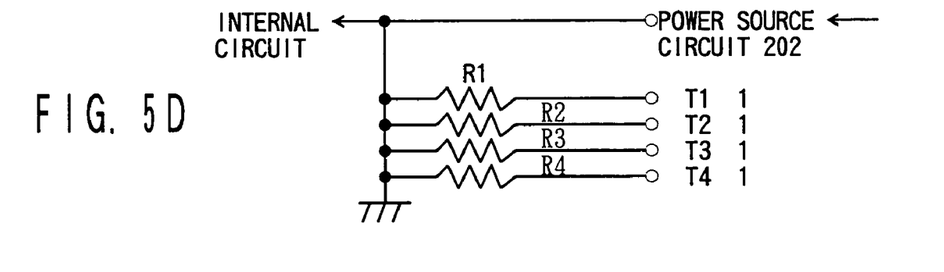

FIG. 5A is a diagram showing an identifying circuit for the CD-ROM drive unit 109 according to the first embodiment of the present invention. FIG. 5B is a diagram showing an identifying circuit for the DVD-ROM drive unit 110 according to the first embodiment of the present invention. FIG. 5C is a diagram showing an identifying circuit for the hard disk drive unit 111 according to the first embodiment of the present invention. FIG. 5D is a diagram showing an identifying circuit for the magneto-optical disc drive unit 112 according to the first embodiment of the present invention.

When the CD-ROM drive unit 109 is connected to the multi bay 108, the identifying circuit for the CD-ROM drive unit 109 receives power from the power source circuit 202 shown in FIG. 5A. The power supplied from the power source circuit 202 is supplied to an identification signal output terminal T1 of four identification signal output terminals T1, T2, T3 and T4 through a resistor R1. In this case of the CD-ROM drive unit 109, the other identification signal output terminals T2, T3 and T4 are grounded.

Hence, an identification signal formed by outputs of the four identification signal output terminal T1, T2, T3 and T4 shows "1000". When the identification signal "1000" is supplied to the information processing unit 203 from the drive unit mounted in the multi bay 108, the information processing unit 203 recognizes that the CD-ROM drive unit 109 is connected to the multi bay 108. Thus, the information processing unit 203 executes processes corresponding to the CD-ROM drive unit 109.

When the DVD-ROM drive unit 110 is connected to the multi bay 108, the identifying circuit 410 for the DVD-ROM drive unit 110 receives power from the power source circuit 202 shown in FIG. 5B. The power supplied from the power source circuit 202 is supplied to the identification signal output terminals T1 and T2 of the four identification signal output terminals T1, T2, T3 and T4 through resistors R1 and R2. In this case of the DVD-ROM drive unit 110, the other identification signal output terminals T3 and T4 are grounded.

Hence, the identification signal formed by outputs of the four identification signal output terminals T1, T2, T3 and T4 shows "1100". When the identification signal "1100" is supplied to the information processing unit 203 from the drive unit connected in the multi bay 108, the information processing unit 203 recognizes that the DVD-ROM drive unit 110 is connected to the multi bay 108. Thus, the information processing unit 203 executes processes corresponding to the DVD-ROM drive unit 110.

When the hard disk drive unit 111 is connected to the multi bay 108, the identifying circuit 410 for the hard disk drive unit 111 receives power from the power source circuit 202 as shown in FIG. 5C. The power supplied from the power source circuit 202 is supplied to the identification signal output terminals T1, T2 and T3 of the four identification signal output terminals T1, T2, T3 and T4 through resistors R1, R2 and R3. In this case of the hard disk drive unit 111, the identification signal output terminal T4 is grounded.

Hence, the identification signal formed by outputs of the four identification signal output terminals T1, T2, T3 and T4 shows "1110". When the identification signal "1110" is supplied to the information processing unit 203 from the hard disk drive unit 111 connected in the multi bay 108, the information processing unit 203 recognizes that the hard disk drive unit 111 is connected to the multi bay 108. Thus, the information processing unit 203 executes processes corresponding to the hard disk drive unit 111.

When the magneto-optical disc drive unit 112 is connected to the multi bay 108, the identifying circuit 410 for the magneto-optical disc drive unit 112 receives power from the power source circuit 202 as shown in FIG. 5D. The power supplied from the power source circuit 202 is supplied to all four identification signal output terminals T1, T2, T3 and T4 through resistors R1, R2, R3 and R4.

Hence, the identification signal formed by outputs of the four identification signal output terminals T1, T2, T3 and T4 shows "1111". When the identification signal "1111" is supplied to the information processing unit 203 from the drive unit connected in the multi bay 108, the information processing unit 203 recognizes that the magneto-optical disc drive unit 112 is connected to the multi bay 108. Thus, the information processing unit 203 executes processes corresponding to the magneto-optical disc drive unit 112.

The power control switch 204 will now be described.

Figure 6:
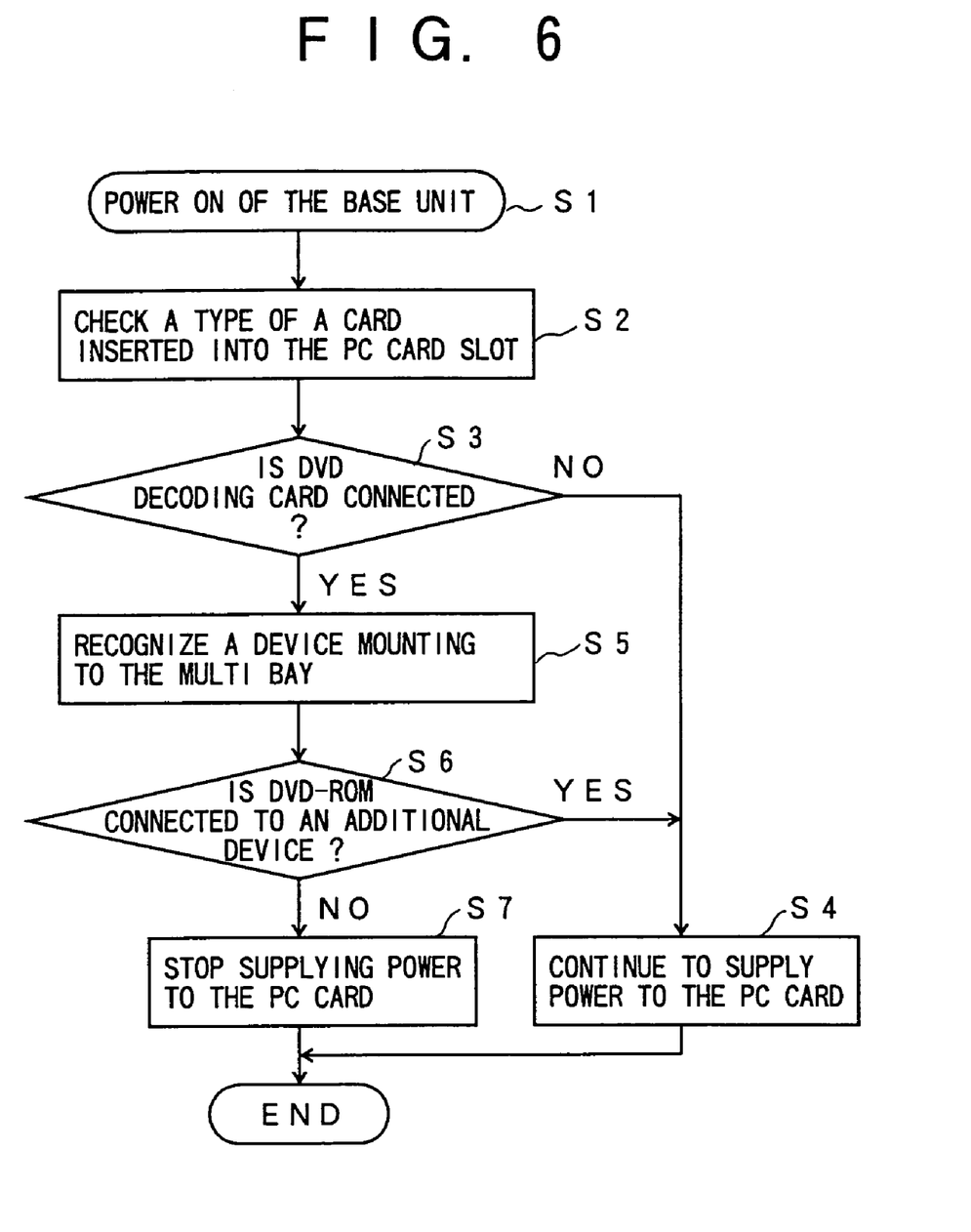
FIG. 6 is a flow chart for explaining a power control according to the first embodiment of the present invention.

FIG. 6 is a flow chart for explaining a power control process according to the first embodiment of the present invention.

When power of the base unit 101 is turned on (step S1), the CPU 211 turns on the power switch 204 through the bridge circuit 217 and judges which PC card is inserted in the PC card slot 116 (step S2).

In the step S2, the CPU 211 sends a request command to request ID information through the PC card controller 216. In accordance with the request command sent from the CPU 211, the PC card, that is, the DVD decoding card 120 shown in FIG. 3, retrieves the ID information that is stored in the identification storage part 303 and that indicates the DVD decoding card. Then, the PC card sends the ID information back to the CPU 211 through the PC card controller 216. Thus, the CPU 211 can recognize which PC card is inserted into the PC card slot 116 based on the ID information retrieved from the identification storage part 303 of the PC card.

Subsequently, after the CPU 211 obtains the ID information, the CPU 211 judges whether the PC card loaded into the PC card slot 116 is a DVD decoding card or not in step S3. In step S4, as a result of step S3, when the PC card loaded into the PC card slot 116 is not the DVD decoding card 120, that is, when the PC card is the modem card 117, the IC memory card 118 or the SCSI card 119, the power control switch 204 remains being ON to supply power to the PC card because the PC card may be used.

On the contrary, when the PC card inserted into the PC card slot 116 is the DVD decoding card 120, the CPU 211 judges which device is inserted into the multi bay 108 in step S5.

As described by referring to FIG. 5A through FIG. 5D, in the step S5, when the device unit is turned on, the CPU 211 judges based on the identification signal from the identifying circuit 410. When the identification signal shows "1000", the device unit is the CD-ROM drive unit 109. When the identification signal shows "1100", the device unit is the DVD-ROM drive unit 110. When the identification signal shows "1110", the device unit is the hard disk drive unit 111. When the identification signal shows "1111", the device unit is the magneto-optical disc drive unit 112.

Moreover, the CPU 211 judges whether the DVD-ROM drive unit 110 is connected to the multi bay 108 or not in step S6.

In step S6, when it is judged that the DVD-ROM drive unit 110 is connected to the multi bay 108, the power control switch 204 remains being ON and power is being supplied to the DVD decoding card 120 because it is needed to operate the DVD decoding card 120 inserted into the PC card slot 116 when the DVD-ROM drive unit 110 is operated.

On the other hand, in step S6, when it is judged that a drive unit other than the DVD-ROM drive unit 110 is connected to the multi bay 108, the power control switch 204 is turned off a supply of power to the DVD decoding card 120 is stopped in step S7 because it is not required to operate the DVD decoding card 120 inserted into the PC card slot 116 while the drive unit connected to the multi bay 108 is operated.

As described above, according to the first embodiment, a type of the PC card inserted into the PC card slot 116 and a type of the drive unit connected to the multi bay 108 are judged and the power control switch 204 is controlled to be ON or OFF. Therefore, even if the DVD decoding card 120 is inserted into the PC card slot 116, the power is not supplied to the DVD decoding card 120 while the DVD-ROM drive unit 110 is not connected to the multi bay 108. Accordingly, it is possible to prevent from supplying extra power. Thus, unwanted power consumption can be reduced.

In this embodiment, the supply of power to the DVD decoding card 120 is controlled, but the present invention is not limited to this case. The power control according to the present invention can be applied to any case in which the process is performed by the PC card inserted into the PC card slot 116 and the drive unit connected to the multi bay 108. Also, the supply of power to a drive unit may be controlled when a drive unit always requires a PC card in a process.

In the first embodiment, the supply of power is controlled when the base unit 101 is turned on. But alternatively, the supply of power may be controlled when a drive unit is connected again to the multi bay or when the PC card is inserted again into the PC card slot.

A power control, in a case in which a supply of power to the PC card is controlled when the drive unit is connected again to the multi bay or when the PC card is connected again to the PC card slot, will now be described.

A construction of the power control in a second embodiment is the same as that of the power control in the first embodiment and the description thereof will be omitted. However, the power control process in the second embodiment is different from that in the first embodiment.

Figure 7:
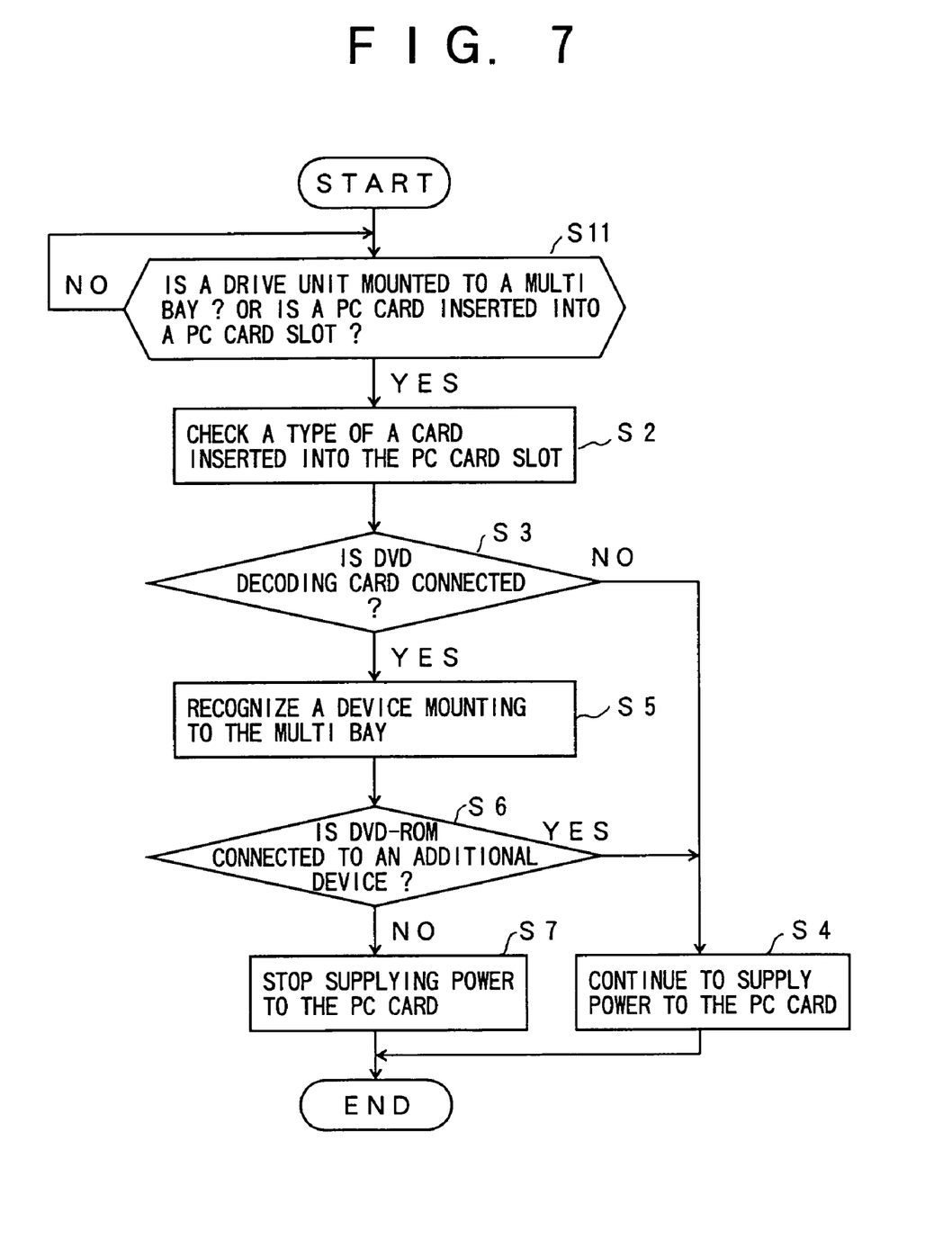
FIG. 7 is a flow chart for explaining the power control according to a second embodiment of the present invention.

FIG. 7 is a flow chart for explaining the power control according to the second embodiment of the present invention. In FIG. 7, those steps that are the same as the steps of FIG. 6 are designated by the same reference numerals, and the description thereof is omitted.

In the second embodiment, step S11 is processed instead of step S1 shown in FIG. 6.

In step S11, it is judged whether a drive unit 110 is connected to the multi bay 108 or whether a PC card is inserted into the PC card slot 116. The step S2 is processed when the drive unit 110 is connected or when the PC card is inserted.

In the first and the second embodiments, the supply of power to the PC card is stopped in the case of the combination of the DVD decoding card and another drive unit. But alternatively, the supply of power may be stopped in accordance with a combination of more than two of a plurality of cards and a plurality of drive units.

A power control in a case of combinations of more than two of a plurality of cards and a plurality of drive units will now be described.

A construction of the power control in a third embodiment is the same as that of the power control in the first embodiment and the description thereof will be omitted.

Figure 8:
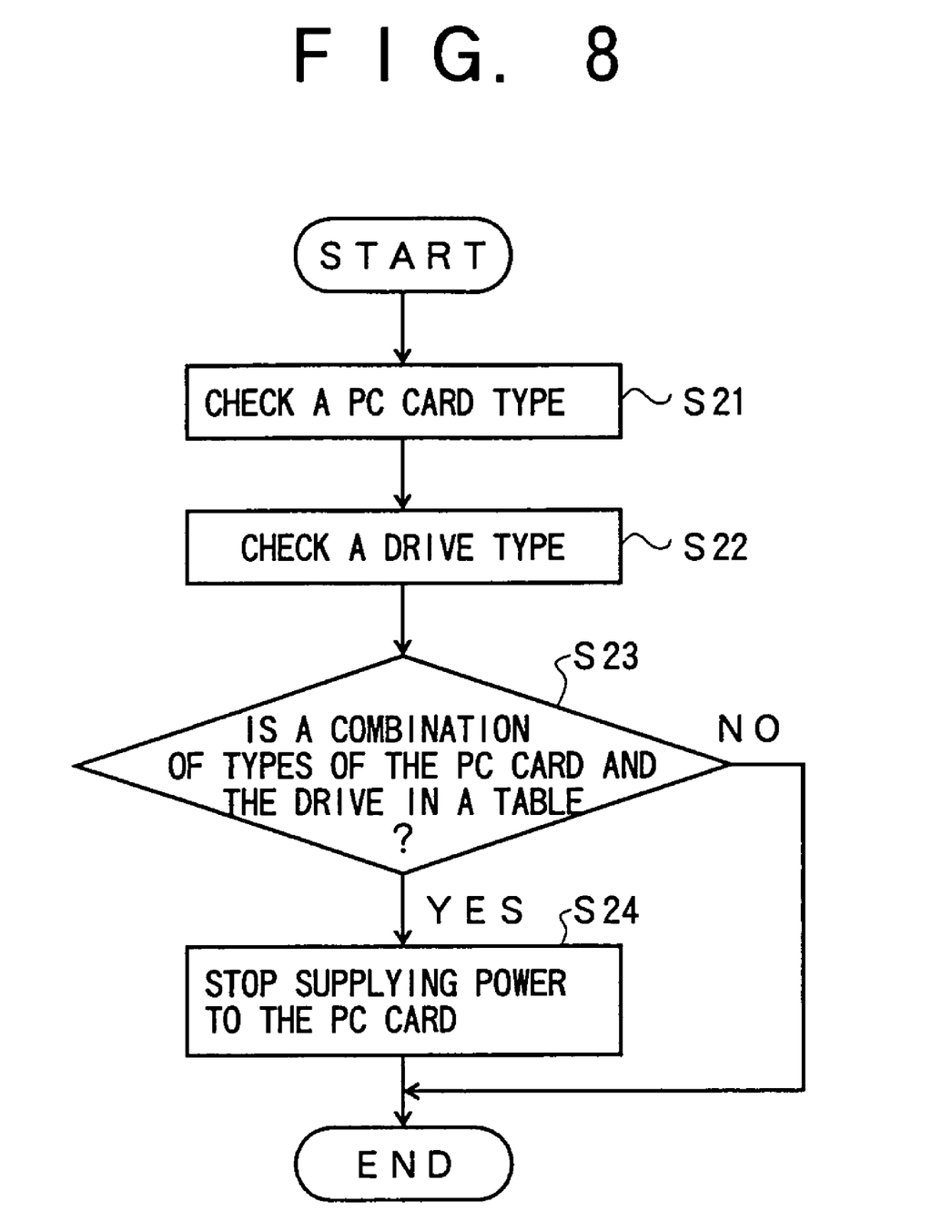
FIG. 8 is a flow chart for explaining the power control according to a third embodiment of the present invention.

FIG. 8 is a flow chart for explaining the power control according to the third embodiment of the present invention.

The power control in the third embodiment includes step S21 of identifying types of PC cards inserted into the PC card slot 116, step S22 of identifying types of drive units connected to the multi bay 108, step S23 of judging whether or not a combination of types of PC cards identified in step S21 and types of drive units identified in step S22 is in a table and step S24 for stopping the supply of power to the PC cards.

In step S21, as the same as step S2 in the first embodiment, identification information is read from the PC cards inserted into the PC card slot 116 and the PC card types are judged.

In step S22, as the same as step S5 in the first embodiment, the types of the drive units connected to the multi bay 108 are judged.

In step S23, with reference to the table provided beforehand in the information processing unit 203, it is judged whether or not a combination of the PC card types identified in step S21 and the drive unit types identified in step S22 is in the table.

When the combination of the PC card types identified in step S21 and the drive unit types identified in step S22 is one of combinations in the table, step S24 is processed to stop the supply of power to the PC cards.

On the other hand, in step S23, when the combination of the PC card types identified in step S21 and the drive unit types identified in step S22 is not in the table, the process is terminated.

In the first and the second embodiments, the supply of power is controlled in accordance with a combination of two units. But alternatively, the supply of power to at least one unit may be stopped in accordance with a combination of three units.

In the third embodiment, the types of drive units connected to the multi bay is judged and the supply of power to the PC cards is controlled. But alternatively, by using another I/O interface, the types of the drive units connected to the another I/O interface may be judged and control the supply of power to the PC cards is controlled.

Moreover, the power control according to the present invention is not limited to the PC cards but may apply to the drive units.

The present invention is not limited to the specifically disclosed embodiments, variations and modifications, and other variations and modifications may be made without departing from the scope of the present invention.

The present application is based on Japanese Priority Application No. 11-131373 filed May 12, 1999, the entire contents of which are hereby incorporated by reference.

The invention claimed is:

1. An electronic apparatus, comprising:
   a judging part judging whether a combination of a plurality of units is to realize a desired function, each unit in said combination of a plurality of units being detachable from said electronic apparatus and exchangeable to a different type unit; and a power supply control part controlling a supply of power from a power source to at least one of said units of said combination used to realize said desired function based on a judgment result of the judging part based on an aspect of simultaneous operation of each unit in said combination of the plurality of units, wherein the judging part comprises:
an identification information obtaining part obtaining identification information for identifying from said plurality of units; and
an information judging part judging whether said desired function is realized based on the identification information obtained from said plurality of units, wherein said combination of said plurality of units is determined from the identification information.

2. The electronic apparatus as claimed in claim 1, wherein said plurality of units includes at least one device unit reading information and at least one PC card decoding the information read by the device unit, said judging part identifying a type of said device unit and a type of said PC card, and said power supply control part stopping the supply of power to the PC card when said judging part judges that said device unit does not use said PC card.

3. The electronic apparatus as claimed in claim 2, wherein said power supply control part supplies the power to said PC card when said judging part judges that said PC card is used with the desired device unit, or when said judging part judges that said PC card is used with the desired device unit and the desired device unit is connected to said electronic apparatus, and said power supply control part stops the supply of power to said PC card when said PC card is used with the desired device unit but the desired device unit is not connected to said electronic apparatus.

4. The electronic apparatus as claimed in claim 1, wherein said power source is a battery unit.

5. An electronic apparatus connectable to a plurality of units including at least one PC card slot and one driver unit, comprising:
a judging part judging whether a combination of at least two of said plurality of units is a predetermined combination, each unit in said combination of a plurality of units being detachable from said electronic apparatus and exchangeable to a different type unit; and
a power source control part stopping a supply of power to at least one unit in the combination when said judging part judges that the combination is the predetermined combination based on an aspect of simultaneous operation of each unit in said combination of the plurality of units.

6. The electronic apparatus as claimed in claim 5, wherein said judging part comprises a table storing predetermined combinations of two of said plurality, of units, and said judging part judges whether the combination is one of the predetermined combinations based on the table.

7. The electronic apparatus as claimed in claim 5, wherein said judging part judges whether or not a combination of said plurality of units is the predetermined combination when the electronic apparatus is turned on or when said plurality of units are connected to the electronic apparatus.

8. A power control apparatus for an electronic apparatus, comprising:
a judging part judging whether a combination of a plurality of units is to realize said desired function, each unit in said combination of a plurality of units being detachable from said electronic apparatus and exchangeable to a different type unit; and a power supply control part controlling a supply of power from a power source to said units of said combination used to realize said desired function based on a judgment result of said judging part, wherein said judgment is based on an aspect of simultaneous operation of each unit in said combination of the plurality of units, wherein the judging part comprises:
an identification information obtaining part obtaining identification information for identifying from said plurality of units; and
an information judging part judging whether said desired function is realized based on the identification information obtained from said plurality of units, wherein said combination of said plurality of units is determined from the identification information.

9. A power control apparatus for an electronic apparatus connectable to a plurality of units including at least one PC card slot and one driver unit, comprising:
a judging part judging whether or not a combination of at least two of said plurality of units is a predetermined combination, each unit in said combination of a plurality of units being detachable from said electronic apparatus and exchangeable to a different type unit; and
a power control part stopping a supply of power to at least one unit of the predetermined combination when it is judged that the combination is the predetermined combination based on an aspect of simultaneous operation of each unit in said combination of the plurality of units, wherein the judging part comprises:
an identification information obtaining part obtaining identification information for identifying from said plurality of units; and
an information judging part judging whether said desired function is realized based on the identification information obtained from said plurality of units, wherein said combination of said plurality of units is determined from the identification information.

10. The power control apparatus as claimed in claim 9, wherein said judging part comprises a table storing predetermined combinations of at least two of said plurality of units, and said judging part judges whether the combination of at least two of said plurality of units is one of the predetermined combinations based on the table.

11. The power control apparatus as claimed in claim 9, wherein said judging part judges whether or not said combination of at least two of said plurality of units is the predetermined combination when said electronic apparatus is turned on or when connected to said plurality of units.

12. A method for controlling a supply of power in an electronic apparatus, comprising:
judging whether a combination of a plurality of units is to realize a desired function and practicing a judgment result, each unit in said combination of a plurality of units being detachable from said electronic apparatus and exchangeable to a different type unit; and
controlling a supply of power from a power source to at least one of said units of said combination used to realize said desired function based on the judgment result, wherein said judgment is based on an aspect of simultaneous operation of each unit in said combination of the plurality of units, wherein said judging comprises:
- obtaining identification information for identifying from said plurality of units, and
- judging whether said desired function is realized based on the identification information obtained from said plurality of units, wherein said combination of said plurality of units is determined from the identification information.

13. The method as claimed in claim 12, wherein said plurality of units includes at least one device unit reading information and at least one PC card decoding the information read by the device unit, said judging identifies a type of said device unit and a type of said PC card, and said controlling a supply of power stops the supply of power to the PC card when said judging part judges that said device unit does not use said PC card.

14. The method as claimed in claim 12, wherein said controlling a supply of power comprises:
- supplying the power to said PC card when said judging judges that said PC card is used with a desired device unit, or when said judging judges that said PC card is used with the desired device unit and the desired device unit is connected to said electronic apparatus, and
- stopping the supply of power to said PC card when said PC card is used with the desired device unit but the desired device unit is not connected to said electronic apparatus.

15. A method for controlling a supply of power in an electronic apparatus connectable to a plurality of units including at least one PC card slot and one driver unit, each unit in said combination of a plurality of units being detachable from said electronic apparatus and exchangeable to a different type unit, comprising:
- judging whether a combination of at least two units of said plurality of units is a predetermined combination based on an aspect of simultaneous operation of each unit in said combination of plurality of units; and
- stopping a supply of power to at least one of said of at least two units in the combination when said judging part judges that the combination is the predetermined combination.

16. The method as claimed in claim 15, wherein said judging judges whether or not said combination of at least two units is the
- predetermined combination when said electronic apparatus is turned on or when said two units are connected to said electronic apparatus.

17. An electronic judging apparatus for judging whether a combination of a plurality of units is to realize a desired function each unit in said combination of a plurality of units being detachable from said electronic apparatus and exchangeable to a different type unit, comprising:
- an identification information obtaining part obtaining identification information from each of the units; and
- an information judging part judging whether the desired function is realized based on the identification information obtained, wherein the combination of the plurality of units is determined from the identification information.

* * * * *

UNITED STATES PATENT AND TRADEMARK OFFICE
CERTIFICATE OF CORRECTION

PATENT NO. : 6,996,731 B1
APPLICATION NO. : 09/535984
DATED : February 7, 2006
INVENTOR(S) : Toshiro Obitsu Page 1 of 1

It is certified that error appears in the above-identified patent and that said Letters Patent is hereby corrected as shown below:

On Title page item 56

Page 1, in column 2 under OTHER PUBLICATIONS on the first line after "Rausch" delete "." and insert --,--

Page 1, in column 2 under OTHER PUBLICATIONS on the third line delete "1997.," and insert --1997,--

Column 11, line 56 in Claim 8, after "plurality" delete ","

Signed and Sealed this

Thirtieth Day of January, 2007

JON W. DUDAS
*Director of the United States Patent and Trademark Office*